(12) United States Patent
Dutta et al.

(10) Patent No.: US 9,225,649 B2
(45) Date of Patent: Dec. 29, 2015

(54) SYSTEM AND METHOD FOR DATA PLANE FATE SEPARATION OF LABEL DISTRIBUTION PROTOCOL (LDP) LABEL SWITCHED PATHS (LSPS)

(71) Applicant: ALCATEL LUCENT, Boulogne-Billancourt (FR)

(72) Inventors: Pranjal K Dutta, Mountain View, CA (US); Mustapha Aissaoui, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 127 days.

(21) Appl. No.: 13/857,118

(22) Filed: Apr. 4, 2013

(65) Prior Publication Data

US 2013/0266006 A1   Oct. 10, 2013

Related U.S. Application Data

(60) Provisional application No. 61/620,279, filed on Apr. 4, 2012.

(51) Int. Cl.
*H04L 12/28* (2006.01)
*H04L 12/801* (2013.01)
*H04L 12/723* (2013.01)
*H04L 12/703* (2013.01)

(52) U.S. Cl.
CPC .............. *H04L 47/12* (2013.01); *H04L 45/28* (2013.01); *H04L 45/507* (2013.01)

(58) Field of Classification Search
CPC ............... H04L 2012/421; H04L 41/0677; H04L 45/302
See application file for complete search history.

(56) References Cited

U.S. PATENT DOCUMENTS

| 7,668,949 B1 * | 2/2010 | Allan ........................ 709/223 |
| 7,903,554 B1 | 3/2011 | Manur et al. |
| 2011/0261812 A1 * | 10/2011 | Kini et al. ................... 370/389 |
| 2012/0147737 A1 * | 6/2012 | Taylor et al. ................ 370/219 |
| 2013/0083691 A1 * | 4/2013 | Murphy et al. .............. 370/254 |

FOREIGN PATENT DOCUMENTS

| JP | 2006333469 A | 12/2006 |
| JP | 201128864 A | 10/2011 |
| WO | 20005119980 A | 12/2005 |

OTHER PUBLICATIONS

Jul. 11, 2013 The International Search Report & The Written Opinion of The International Searching Authority, or The Declaration in PCT/US2013/035342, Alcatel-Lucent USA Inc., Applicant, 13 pages.

(Continued)

*Primary Examiner* — Andrew Lai
*Assistant Examiner* — Jamaal Henson
(74) *Attorney, Agent, or Firm* — Wall & Tong, LLC (57) ABSTRACT

A system, method and apparatus for controlling traffic forwarding at a label switched router (LSR) to implement thereby a constrained traffic forwarding application, such as a data plane fate separation between different FEC types.

20 Claims, 5 Drawing Sheets

(56) References Cited

OTHER PUBLICATIONS

Villamizar C et al: "Multipath Extensions for MPLS Traffic Engineering; draft-villamizar-mpls-tp-multipath-te-extn-01.txt", Multipath Extensions for MPLS Traffic Engineering; Draft-Villamizar-MPLS-TP-multipath-TE-EXTN-01.TXT, Internet Engineering Task Force, IETF; Standardworkingdraft, Internet Society (ISOC) 4, Rue Des Falaises CH-1205 Geneva, Switzerland, Feb. 28, 2012, pp. 1-26, XP015080862, [retrieved on Feb. 28, 2012].

Dutta M Aissaoui Alcatel-Lucent P: "LDP Adjacency Capabilities; draft-pdutta-mpls-ldp-adj-capability-00.txt", LDP Adjacency Capabilities; Draft-PDUTTA-MPLS-LDP-ADJ-Capability-00.txt, Internet Engneering Task Force, IETF; Standardworkingdraft, Internet Society (ISOC) 4, Rue Des Falaises CH-1205 Geneva, Switzerland, Apr. 5, 2012, pp. 1-8, XP015082304, [retrieved on Apr. 5, 2012].

B Thomas K Raza Cisco Systems B et al: "LDP Capabilities; rfc5561. txt", LDP Capabilities, RFC5561.txt, Internet Engineering Task Force, IETF; Standard, Internet Society (ISOC) 4, Rue Des Falaises CH-1205 Geneva, Switzerland, Jul. 1, 2009, XP015065626, [retrieved on Jul. 16, 2009].

Zhao Huawei Technology L Fang C Zhou Cisco Systems L Li China Mobile N SO Q: "LDP Extensions for Multi Topology Routing; draft-ietf-mpls-ldp-multi-topology-03.txt", LDP Extensions for Multi Topology Routing; Draft-IETF-MPLS-LDP-Multi-Topology-03.txt, Internet Engineering Task Force, IETF; Standardworking Draft, Internet Society (ISOC) 4, Rue Des Falaises CH-1205 Geneva, Switzerland, Mar. 12, 2012, pp. 1-18, XP015081854, [retrieved on Mar. 12, 2012].

Office Action received in corresponding Korean Application No. 2014-7027866, dated Apr. 8, 2015, pp. 1-5.

* cited by examiner

SYSTEM AND METHOD FOR DATA PLANE FATE SEPARATION OF LABEL DISTRIBUTION PROTOCOL (LDP) LABEL SWITCHED PATHS (LSPS)

CROSS-REFERENCE TO RELATED APPLICATION

This application claims the benefit of U.S. Provisional Patent Application Ser. No. 61/620,279, filed Apr. 4, 2012, entitled SYSTEM, METHOD AND APPARATUS FOR IMPROVED MPLS, which application is incorporated herein by reference in its entirety.

FIELD OF THE INVENTION

The invention relates to the field of communication networks such as multi-protocol label switching (MPLS) networks and, more particularly but not exclusively, to traffic forwarding capability (TFC) in a network.

BACKGROUND

Multiprotocol Label Switching (MPLS) enables efficient delivery of a wide variety of differentiated, end-to-end services. The Internet Engineering Task Force (IETF) describes architecture for Multiprotocol Label Switching (MPLS) in its Request for Comment (RFC) document denoted as RFC 3031, and entitled "Multiprotocol Label Switching Architecture."

A fundamental concept in MPLS is that two Label Switching Routers (LSRs) must agree on the meaning of the labels used to forward traffic between and through them. This common understanding is achieved by using a set of procedures, called a label distribution protocol, by which one Label Switch Router (LSR) informs another of label bindings it has made.

SUMMARY

Various deficiencies in the prior art are addressed by systems, methods and apparatus for controlling traffic forwarding at a label switched router (LSR) to implement thereby a constrained traffic forwarding application, such as a data plane fate separation between different FEC types.

A method for controlling traffic forwarding at a Label Switched Router (LSR) according to one embodiment comprises: defining one or more traffic forwarding capabilities (TFCs) associated with at least one data plane interface between the LSR and a peer LSR; indicating the one or more defined TFCs to the peer LSR via a LDP message; and propagating traffic toward the peer LSR via the at least one data plane interface, wherein traffic associated with the data plane interface is constrained in accordance with a corresponding one or more TFCs.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments will be described within the context of a network supporting Multi-Protocol Label switching, such as defined in IETF RFC3031 and RFC5036, each of which is herein incorporated by reference in its respective entirety.

Generally speaking, fate-sharing is a design process where it is acceptable to lose the state information associated with an entity if, at the same time, the entity itself is lost. An example of fate-sharing is the transmission of routing messages in routing protocols such as BGP, where the failure of a link or link interface automatically has the effect of terminating routing announcements through that interface, ultimately resulting in the tearing down of the state for that route at each end of the link. Similar considerations apply to Transmission Control Protocol (TCP).

LDP (Label Distribution Protocol) is a signaling protocol for set up and maintenance of MPLS LSPs (Label Switched Paths), and for distributing labels for setting up LSPs. LDP comprises a set of procedures and messages by which Label Switch Routers (LSRs) establish Label Switched Paths (LSPs) through a network by mapping network-layer routing information directly to data-link layer switched paths, i.e., the LSPs. These LSPs may have an endpoint at a directly attached neighbor (comparable to IP hop-by-hop forwarding), an endpoint at a network egress node enabling thereby label switching via all intermediary nodes and the like.

LDP associates a Forwarding Equivalence Class (FEC) with each LSP it creates. The FEC associated with an LSP specifies which packets are "mapped" to that LSP. This FEC is the "context" of a label. LSPs are extended through a network as each LSR "splices" incoming labels for a FEC to the outgoing label assigned by the next hop for the given FEC.

In various embodiments, two neighboring LSR nodes maintain UDP based Hello Adjacencies and a TCP based Session. The Link level Hello Adjacencies determine the links over which directly peering LSRs want to send/receive LSP traffic. The Targeted Hello Adjacencies can be multiple hops away in a network and forms a multi-hop LDP session between non-directly connected LDP LSRs. The LDP Session is the channel through which all labels and various signaling parameters are exchanged (e.g. Label Mappings) with respect to various FECs.

Figure 1:
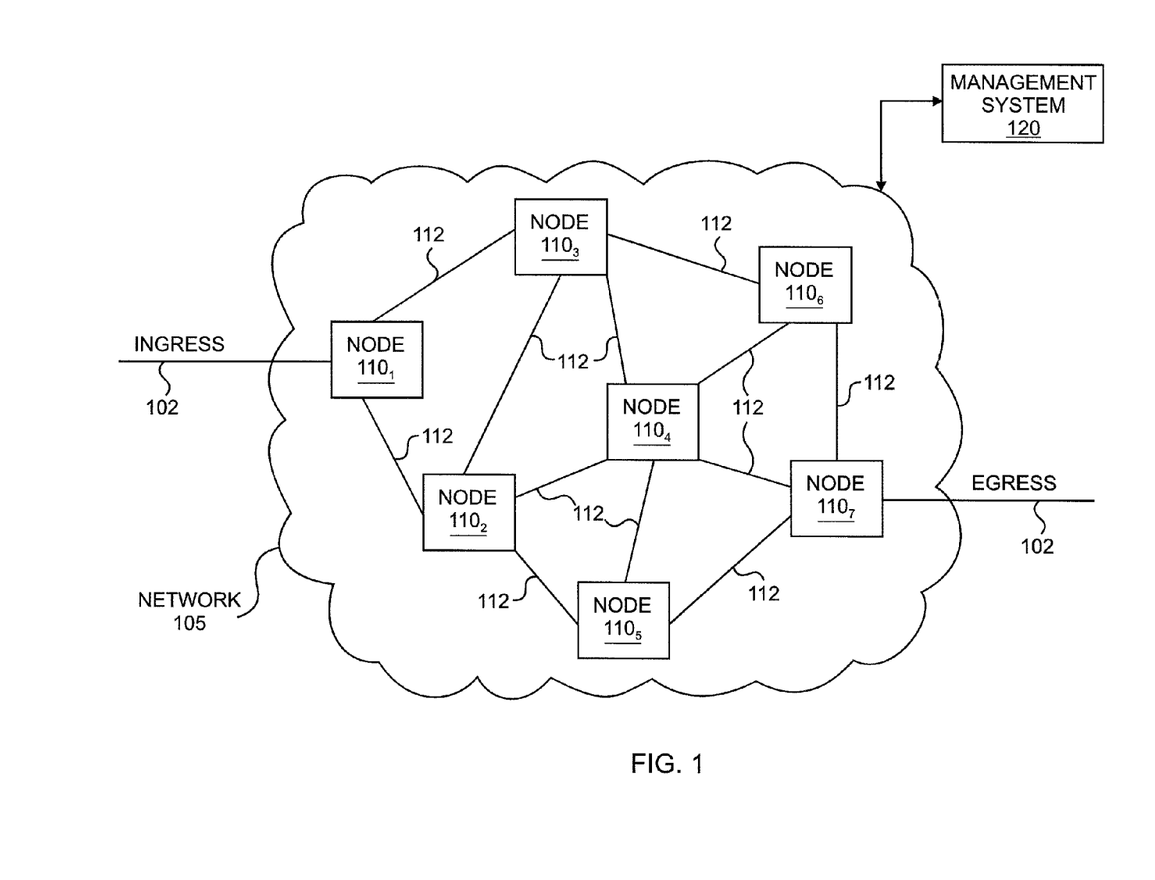
FIG. 1 depicts an exemplary network benefiting from the various embodiments.

FIG. 1 depicts a high-level block diagram of a communication network benefiting from various embodiments. Specifically, the communication network 100 of FIG. 1 includes a plurality of nodes $110_1$-$110_7$ (collectively, nodes 110). The nodes 110 support various combinations of network interfaces NIs 112 and/or external interfaces (EIs) 102. Nodes 110 communicate with external devices (e.g., nodes of other network domains, user devices, and the like) using EIs 102. NIs 112 may include network links. EIs 102 may include external links.

The nodes 110 include communication nodes supporting packet-based communications. In one embodiment, nodes 110 include communication nodes supporting any communication technologies supporting multicast capabilities, such as Internet Protocol (IP), Multiprotocol Label Switching (MPLS), Ethernet, and the like, as well as various combinations thereof. The NIs 112 and EIs 102 include interfaces supporting any communication technologies supported by associated nodes 110.

Although primarily depicted and described herein with respect to a communication network having specific types, numbers, and configurations of nodes 110, NIs 112, and EIs 102, the present embodiments may be implemented in communication networks having various other types, numbers, and configurations of nodes 110, NIs 112, and EIs 102. Similarly, although primarily depicted and described herein with respect to specific multicast communication technologies, the present embodiments may be implemented using various other unicast communication technologies, multicast communication technologies, and the like, as well as various combinations thereof.

The network may be modified by those skilled in the art to use other MPLS related protocols rather than the exemplary protocol discussed herein.

Network 100 includes an IP/MPLS communication network (CN) 105 and at least one network management system (NMS) 120 operative to, illustratively, route traffic between an originating LSR 110-1 and a destination LSR 110-7 via one or more label switched paths (LSPs) 112.

As depicted, NMS 120 is operative to control a plurality of routers 110 forming the CN 105; namely, a plurality of Label Switched Routers (LSRs) 110-1 through 110-7. It will be noted that while only seven LSRs are depicted, CN 105 may include many more LSRs. The representation of CN 105 is simplified for purposes of this discussion.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with CN 105 and various elements related thereto. NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 6.

NMS 120 and the various routers 110 operate to support data plane fate separation of LDP LSPs. The Multi-Protocol Label Switching (MPLS) architecture is described in RFC3031 in IETF.

As depicted in FIG. 1, a traffic stream (e.g., a video or other data stream) is communicated from a source node, illustratively, LSR 110-1 to a destination node, illustratively, LSR 110-7 via one or more label switched paths (LSPs) 112. For example, one path originates at source node (LSR 110-1), traverses the core of CN 105 and terminates at node 110-6 (LSR 110-6) with LSR 110-7 being the destination node. A secondary path originates at source node (LSR 110-1), traverses the core of CN 105 and terminates at node 110-5 (LSR 110-5) with Edge LSR 110-7 being the destination node.

Figure 2:
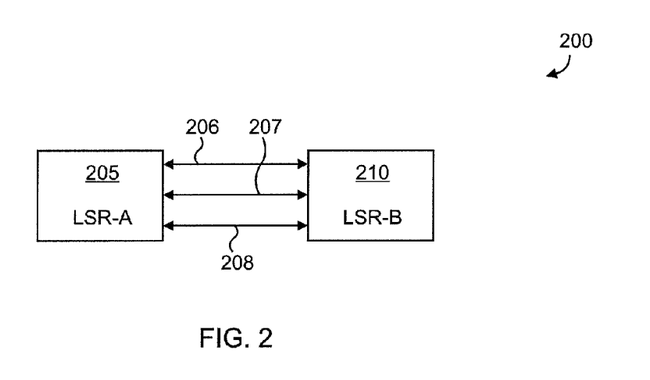
FIG. 2 depicts an exemplary arrangement of parallel links forming an LDP session with Hello Adjacencies over three Equal Cost Multi Path (ECMP) according to one embodiment.

FIG. 2 depicts an exemplary arrangement of parallel links forming an LDP session with Hello Adjacencies over three Equal Cost Multi Path (ECMP) according to one embodiment.

Various embodiments provide for multiple parallel links between two LDP speakers. In one embodiment, multiple Equal Cost Multi Path (ECMP) interfaces between two LDP speakers are established in one session. As such, multiple Hello Adjacencies are associated with the session, one adjacency on each interface. Label mappings are exchanged over the LDP session between the two speakers for multiple FEC types. However, a subset of the parallel links may not be capable of forwarding traffic mapped for certain FEC types. In MPLS, a transit LSR is agnostic to traffic types, but ingress or egress LSR needs to perform "native" functions of a protocol identified by the FEC type.

Various embodiments allow an operator the flexibility to (1) exclude a subset of the parallel links from forwarding a specific traffic type for administrative reasons; and (2) assign disjoint sub-sets of links to each FEC types for fate-separation of traffic in data plane. For example, it may be required to separate fate of IPv4 and IPv6 mapped LDP LSPs between two LDP speakers in data plane. Similarly, an operator can separate multicast LDP LSPs from unicast LSPs in data plane.

In one embodiment, an LDP session is formed between node 205 (LSR-A) and node 210 (LSR-B) with Hello Adjacencies over three Equal Cost Multi Path (ECMP) interfaces respectively denoted as 206 (IF1), 207 (IF2), and 208 (IF3). In this embodiment, for illustrative purposes, the link adjacencies formed over IF1, IF2 and IF3 are using either IPv4 or IPv6 based interfaces but not both, whereas in other embodiments a dual stack implementation is provided wherein both IPv4 and IPv6 addresses may be assigned on via a single interface. Various embodiments are adapted to support different interface configurations, different interface capabilities and the like. For example, the three interfaces 206, 207, 208 may be used in multiple different configurations, including the following:

(1) all the three interfaces are capable of forwarding traffic for IPv4 FEC Element Types;

(2) Interface IF1 (206) and IF2 (207) are capable of forwarding traffic for Multi-point (MP/Multicast) FEC Element defined in RFC6388; and/or (3) Interface IF2 (207) and IF3 (208) are capable of forwarding traffic for IPv6 FEC Element Types, or the operator decided to so enable for fate separation. The implementation of this configuration requires that the traffic forwarding intent/capabilities be set-up by the LDP speakers at per interface level. As such, data plane fate separation is enabled.

In various embodiments, to achieve separation of traffic at the data plane, the LDP Hellos Messages exchanged over the interfaces communicate the traffic forwarding intent/capabilities as described below. This mechanism configures the LSP types in such a manner to be selectively enabled on the interfaces. The configuration, for illustratively purposes, includes:

(1) The LDP Hello Messages exchanged over interface IF1 (206) include traffic forwarding capabilities for IPv4 FEC Type and MP FEC Type Capabilities, and exclude IPv6 FEC Types;

(2) The LDP Hello Messages exchanged over interface IF2 (207) include traffic forwarding capabilities for IPv4 FEC Type, MP FEC Type and IPv6 FEC Types; and (3) The LDP Hello Messages exchanged over interface IF3 (208) include traffic forwarding capabilities for IPv4 FEC Type and IPv6 FEC, and exclude MP FEC Type.

In one embodiment, a Hello Message from an LDP node 205 or speaker includes no more than one instance of a TFC TLV. If an LDP node 205 or speaker receives more than one instance of the TFC TLV in a Hello message, only the first occurrence is accepted by the receiving node, the next occurrences in that message are ignored.

Various embodiments provide for backward compatibility with standard LDP implementations. In these embodiments, when a node or speaker receives a LDP Hello Message without any TFC TLV, then the receiver notes that the interface over which the Hello Adjacency is formed as being capable of forwarding the entire set of FEC types exchanged with the session established with the peer.

FEC Capabilities advertised via LDP session as per RFC 5561 would be applicable to all interfaces unless it is explicitly excluded on a given interface by a TFC exchange.

Traffic Forwarding Capability (TFC) TLV

Various embodiments use a new type-length-value (TLV) element denoted herein as a "TFC" TLV suitable for use by a LSR to indicate to a corresponding LSR peer (e.g., an adjacent LSR) that a traffic forwarding separation, constraint or other condition/capability is desired for one or more data plane interfaces established between the two LSRs. The TFC TLV may be communicated via an LDP session established with a peer LSR, such as within an Optional Parameter portion of a Hello Message.

As discussed herein, various applications are envisioned such as separating traffic to be forwarded according to FEC type, wherein traffic conforming to a first FEC type (or types) is forwarded via a first data plane interface, while traffic conforming to a second FEC type (or types) is forwarded via a second data plane interface. In this manner, fate separation of traffic by type is provided. In various embodiments, three or more interfaces are used.

Figure 3:
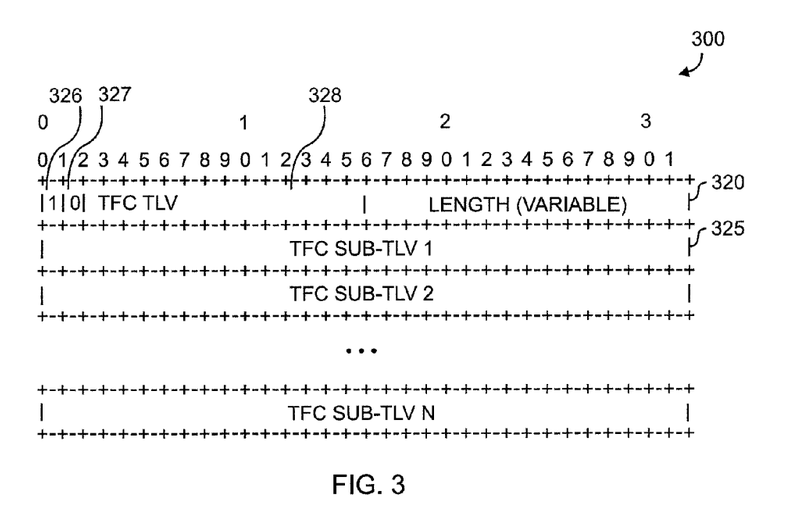
FIG. 3 depicts an exemplary Traffic Forwarding Capability (TFC) information encoded in LDP TLV Type standard format according to one embodiment.

FIG. 3 depicts an exemplary format for a TFC TLV suitable for use in various embodiments discussed herein. Specifically, FIG. 3 depicts an exemplary TFC TLV message 300 suitable for transmission via, illustratively, an optional parameter in a LDP Hello Message to advertise thereby a set of TFCs associated with an Interface. In various embodiments, TFC TLVs are included in Targeted LDP (T-LDP) Hello Messages.

Various embodiments provide for an LDP TFC exchange mechanism implementing the Traffic Forwarding Capability (TFC) to be associated with a LDP Hello Adjacency sessions herein described. In one embodiment, a Vendor Private LDP TLV space as mentioned in RFC 5036 to encode the TLV is used. In other embodiments, each LDP node or speaker implements a set of LDP TFCs per Interface. At any time, a speaker or node may have one or more of those TFCs enabled on an interface or none.

When TFC is enabled, a specific traffic forwarding capability which has been enabled at the session level is turned off or otherwise adapted within the context of an LDP session. For example, in various embodiments the capability to be turned off, constrained or adapted may be related to one or more capabilities related to the various FEC types (e.g., those applicable to link Hello adjacencies between two peer LSRs).

In various embodiments, dedicated links are used to resolve to a subset of FEC types in the data path. In various embodiments, Hello Adjacency Capabilities such as TFC are defined and used to turn OFF a Session capability at the interface level. Various embodiments use a TLV format according to RFC 5561, where the format of an existing LDP Capability TLV is kept, and the TLV is sent along with LDP Hello message. In various embodiments, session capabilities comprise a super-set of capabilities having a default selection of being applicable to all Hello Adjacencies between two LSRs.

By advertising the TFC over the interface, the speaker or originating node asserts that it performs the protocol actions specified for the TFC on that interface. In various embodiments, the speaker or originating node will not perform protocol actions specified for a TFC on an interface unless the TFC has been advertised. Further, in various embodiments when an LDP speaker or originating node had advertised a set of TFCs on the Hello Messages sent over an interface, then the speaker or originating node may announce changes to the advertised TFCs at any time by reflecting the change in subsequent Hello Messages.

TFC information is optionally encoded in the format of standard LDP TLV Type denoted item 320 as shown in FIG. 3 TFC TLV 320 carries a set of sub-TLVs 325, where each sub-TLV defines a specific TFC. In various embodiments, specific TFC sub-TLV may be defined for IPv4 or IPv6 or Multicast traffic types, etc. As shown in FIG. 2B, the first bit 326, i.e., bit 0 of TFC TLV 328 is set to 1. The second bit 327, i.e., bit 1 of TFC TLV 328 is 0. If the TFC TLV type is standardized then the type can be allocated from available types in LDP TLV registry in IANA (Internet Assigned Numbers Authority).

Figure 4:
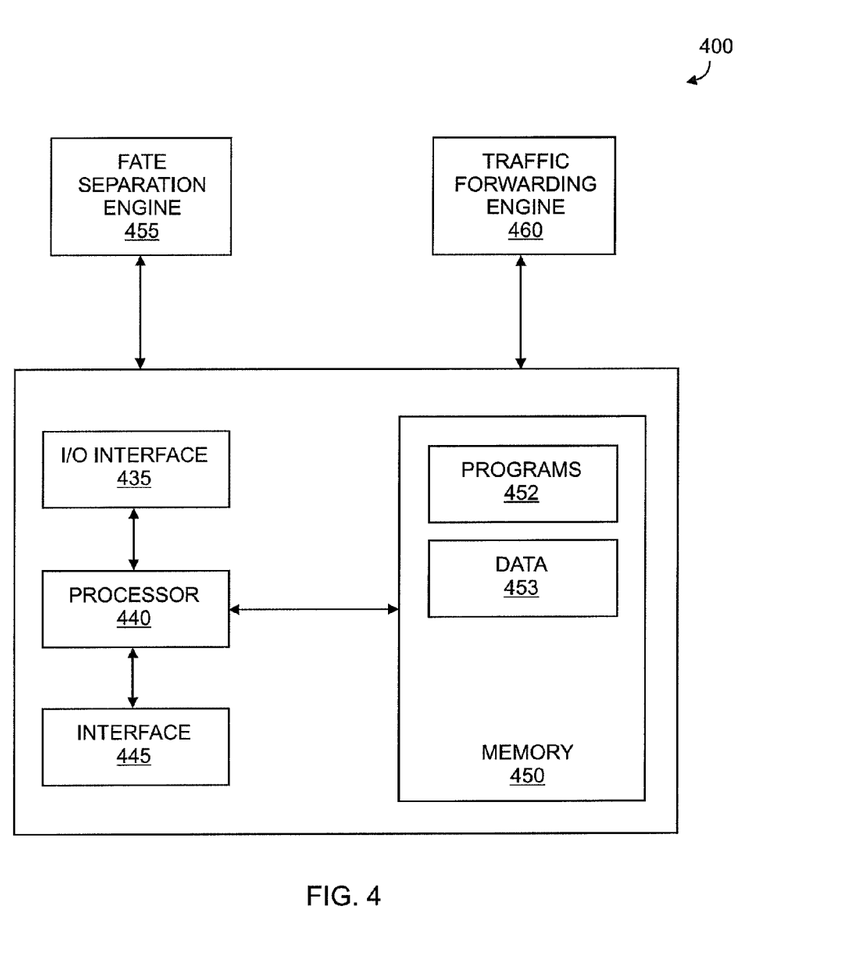
FIG. 4 depicts a high level block diagram of a control portion of an exemplary node suitable for implementing various embodiments.

FIG. 4 depicts a high level block diagram of a control portion 400 of an exemplary node suitable for implementing various embodiments, such as a control portion of LDP nodes 110. As depicted in FIG. 4, a node control portion 400 includes one or more processor(s) 440, a memory 450, an input/output (I/O) interface 435 and network interface 445.

The processor(s) 440 are adapted to cooperate with the memory 450, the network interface 445, the I/O interface 435 and the like to provide the various functions described herein with respect to the nodes 110. In various embodiments, the control portion 400 of an exemplary node may be implemented as described below with respect to the computing device of FIG. 6.

The memory 450, generally speaking, stores programs, data, tools and the like that are adapted for use in providing various control plane and data plane functions associated with the nodes 110. The memory 450 is depicted as storing programs 452 and data 453 useful in supporting the various control plane and data plane functions depicted and described herein. For example, memory 450 is depicted as storing programs 422 and data 423 adapted for use in providing various computing and hosting functions within the MPLS communication system.

Also depicted in FIG. 4 is a fate separation engine 455 and a traffic forwarding engine 460. These engines may be implemented as hardware or firmware modules external to the node control portion 400 described herein. In various embodiments, these engines may be included within or implemented by the node control portion 400 or nodes 110 described herein.

In various embodiments, this memory 450 includes programs and data associated with Fate Separation Engine 455 and Traffic Forwarding Engine 460. In various embodiments, Fate Separation Engine 455, Traffic Forwarding Engine 460 are implemented using software instructions which may be executed by processor (e.g., processor 403) for performing the various functionalities depicted and described herein.

I/O interface 435 and network interface 445 are adapted to facilitate communications with peripheral devices both internal and external to processor 440. For example, I/O interface 435 is adapted to interface with memory 450. Similarly, I/O interface 435 is adapted to facilitate communications with LDP node $110_N$, Fate Separation Engine 455, Traffic Forwarding Engine 460 and the like. In various embodiments, a connection is provided between processor ports and any peripheral devices used to communicate with the MPLS network (not shown).

Although primarily depicted and described with respect to LDP node 110 control portion communication with Fate Separation Engine 455 and Traffic Forwarding Engine 460, it will be appreciated that I/O interface 435 may be adapted to support communications with any other devices suitable for providing the Traffic Forwarding Capability (TFC) to be associated with a LDP Hello Adjacency sessions herein described.

Fate Separation Engine 455 and Traffic Forwarding Engine 460 cooperate to provide the various hosting functions depicted and described herein. Although depicted and described with respect to embodiments in which the engines are external and/or internal to the depicted control portion 400 of an exemplary node, it will be appreciated by those skilled in the art that the engines may be stored in one or more other storage devices internal and/or external to LDP node 110 and/or node control portion 400 thereof. The engines may be distributed across any suitable numbers and/or types of storage devices internal and/or external to LDP node 110 and/or node control portion 400 thereof. Memory 450, including the engines of memory 450, is described in additional detail herein below. Further, it will be appreciated that any of the authentication functions depicted and described herein may be performed by and/or using the engines may be performed by other elements implementing similar functions.

In various embodiments, Fate Separation Engine 455 is adapted to configure the sub-sets of links to each FEC types for fate-separation of traffic in data plane. For example, it may be required to separate fate of IPv4 and IPv6 mapped LDP LSPs between two LDP nodes or speakers in data plane. Similarly, an operator can separate multicast LDP LSPs from unicast LSPs in data plane and the like, as well as various combinations thereof.

In various embodiments, Traffic Forwarding Engine 460 is adapted to implement and perform traffic forwarding capabilities of the interfaces and the like.

Figure 5:
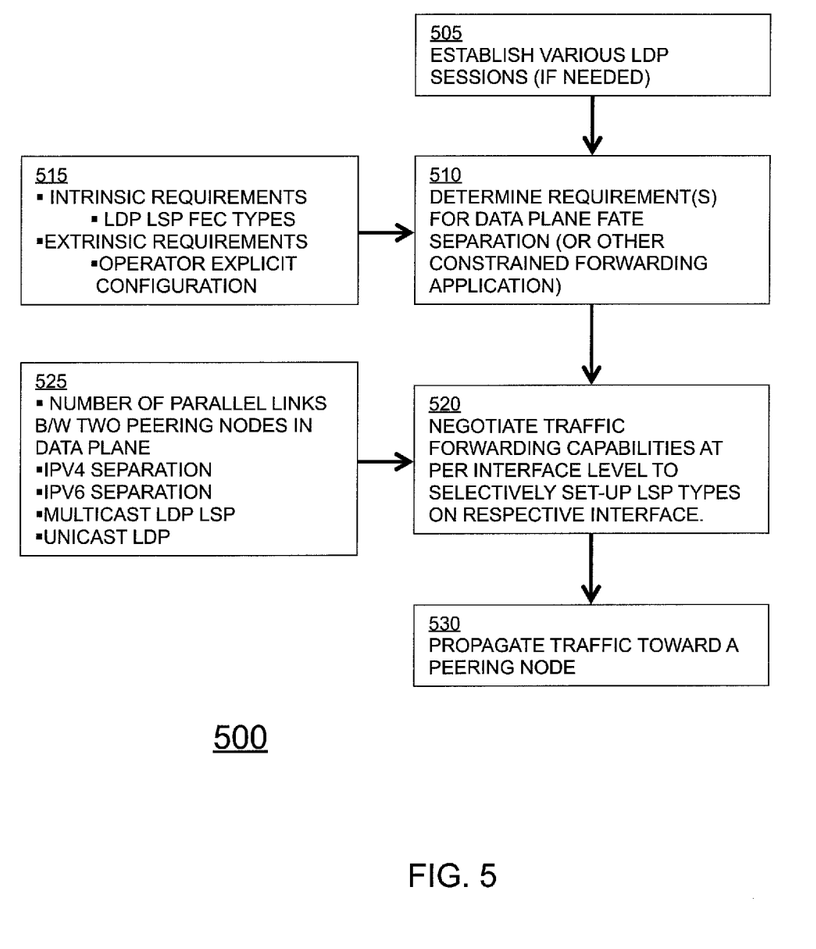
FIG. 5 depicts a flow diagram of a method according to one embodiment.

FIG. 5 depicts a flow diagram of a method according to one embodiment. Method 500 begins at step 505. For purposes of this example, assume that and LDP session is formed between a pair of LSR nodes 110 with Hello Adjacencies over a plurality of Equal Cost Multi Path (ECMP) interfaces. As such, multiple Hello Adjacencies are associated with the LDP session, one adjacency on each interface. Label mappings are exchanged over the LDP sessions between the two LSR nodes 110 for multiple FEC types.

At step 505, the various LDP sessions are established between the two LSR nodes 110 if needed.

At step 510, requirements associated with a data plane fate separation or other constrained forwarding application are determined. Referring to box 515, for purposes of data plane fate separation, two types of requirements may be considered; namely, intrinsic requirements such as LDP LSP FEC types, or extrinsic requirements such as system manager or operator explicit configuration parameters. Different intrinsic and or extrinsic requirements may be employed to pending upon the type of constrained forwarding application contemplated. As previously discussed, various embodiments allow an operator the flexibility to (1) exclude a subset of the parallel links from forwarding a specific traffic type for administrative reasons; and (2) assign disjoint sub-sets of links to each FEC types for fate-separation of traffic in data plane. In various embodiments, a network management system provides intrinsic and/or extrinsic requirements to LSR is within a network via a policy-based or policy distribution mechanism.

At step 520, traffic forwarding capabilities at a per interface level are negotiated to selectively establish or set up specific LSP types on respective interfaces. That is, LDP messaging is used by a source LSR 110 to indicate (e.g., via a TFC TLV) specific traffic forwarding capabilities or constraints to be applied to the various interfaces, such as type-separation within the context of a fate separation application. Referring to box 525, various considerations include a number of parallel data plane links between source and destination LSRs, specific FEC types to be carried by each link and so on.

In various embodiments, the source LSR indicates (e.g., advertises via TFC TLV) the traffic constraint to the destination LSR and forwards traffic accordingly. In various embodiments, the source LSR waits for a response or acknowledgment from the destination LSR prior to forwarding traffic in accordance with the TFC parameters associated with the constrained forwarding application. In various embodiments, the destination LSR may reject some or all of the TFC parameters associated with one or more of the various data plane interfaces. This back and forth negotiation and the various embodiments may be accomplished via TFC TLV information included within Hello Messages or other LDP messages.

Thus, in various embodiments, traffic is propagated toward the peer LSR in accordance with the indicated traffic forwarding capabilities or constraints after receiving an acknowledgment message from the peer LSR that indicated traffic forwarding capabilities or constraints are acceptable.

In various embodiments, the acknowledgment message may include a rejection of one or more traffic forwarding capabilities or constraints, in which case traffic is propagated toward the peer LSR in accordance with non-rejected traffic forwarding capabilities or constraints.

In various embodiments, the acknowledgment message may include proposed alternate traffic forwarding capabilities or constraints and/or configurations thereof, such as the use of different traffic forwarding capabilities or constraints, the use of the same traffic forwarding capabilities or constraints within the context of different data plane interfaces or some combination thereof. If acceptable to the source LSR, then the source LSR propagates traffic toward the peer LSR in accordance with the proposed alternate traffic forwarding capabilities or constraints and/or configurations thereof. If not acceptable to the source LSR, then the source LSR may propose a second set of traffic forwarding capabilities or constraints to the peer LSR. This process is repeated as needed until agreement, or until the expiration of a predefined or agreed upon time interval, or until a predefined or agreed upon number of iterations has been exceeded.

At step 530, traffic is propagated toward the peering node via the appropriate interface as defined by the various traffic forwarding capability requirements implemented by, illustratively, the source LSR.

In various embodiments, some forms of traffic may receive preferential treatment in that they may be forwarded to the peering node via multiple interfaces. In various embodiments, traffic fate separation is useful where a subset of parallel links between two LSR may not be capable of forwarding traffic mapped for certain FEC types, such as ingress or egress LSRs that need to perform "native" processing functions for traffic associated with a particular FEC type. In various embodiments, system operators may administratively prefer specific subsets of parallel links to be excluded from traffic forwarding for specific traffic types. In various embodiments, this joint sub-sets of links may be assigned by an operator to one or more FEC types to implement thereby fate separation of traffic in the data plane. As previously noted, various configurations prove useful to system operators for various reasons, such as separation of IPv4 and IPv6 mapped LDP LSPs, separation of unicast and multicast LDP LSPs and the like.

Generally speaking, each interface may be configured according to one or more TFC parameters. As such, traffic can then be forwarded using an LSP associated with an interface configured for a specific TFC.

Although primarily depicted and described with respect to the enumerated embodiments, other embodiments associated with a specific network may be implemented using other procedures and combinations of the above. Generally speaking, separation or other traffic forwarding capabilities or constraints may be determined according to FEC types, such as an IPv4 FEC Element Type, an IPv6 Element Type, a Unicast Element Type, a Multicast Element Type, a PseudoWire Element Type, a MultiCast PseudoWire Element Type and so on. In addition, separation may be based upon traffic source (e.g., preferred source, prioritized source and the like) or other policy considerations.

Figure 6:
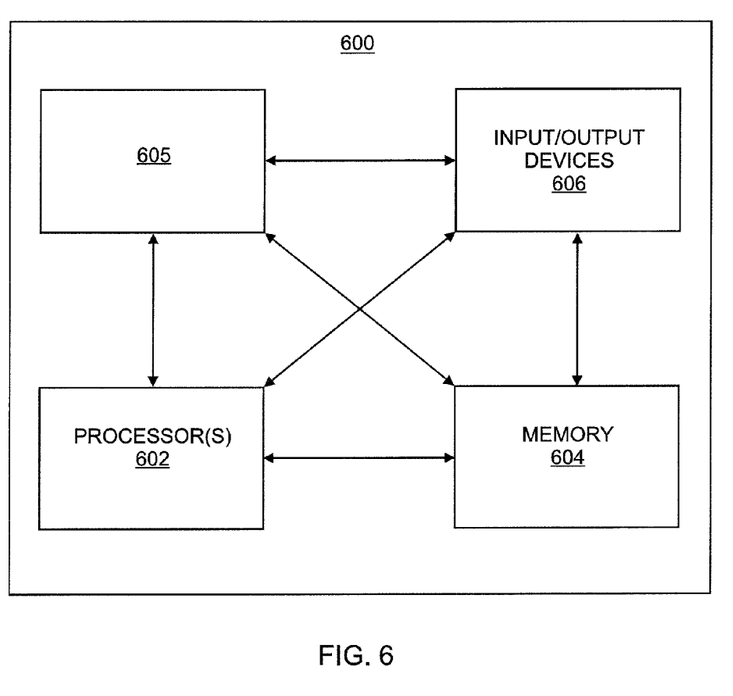
FIG. 6 depicts a high-level block diagram of a computing device, such as a processor in a telecom network element, suitable for use in performing functions described herein.

FIG. 6 depicts a high-level block diagram of a computing device, such as a processor in a telecom network element, suitable for use in performing functions described herein such as those associated with the various elements described herein with respect to the figures.

As depicted in FIG. 6, computing device 600 includes a processor element 603 (e.g., a central processing unit (CPU) and/or other suitable processor(s)), a memory 604 (e.g., random access memory (RAM), read only memory (ROM), and the like), a cooperating module/process 605, and various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 605 can be loaded into memory 604 and executed by processor 603 to implement the functions as discussed herein. Thus, cooperating process 605 (including associated data structures) can be stored on a computer readable storage medium, e.g., RAM memory, magnetic or optical drive or diskette, and the like.

It will be appreciated that computing device 600 depicted in FIG. 6 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for controlling traffic forwarding at a Label Switched Router (LSR), comprising:
    defining one or more traffic forwarding capabilities (TFCs) associated with each of a plurality of data plane interfaces between said LSR and a peer LSR, wherein the one or more TFCs defined for at least one interface differs from the one or more TFCs defined for at least one other interface of the plurality of data plane interfaces;
    indicating said one or more defined TFCs for each of the plurality of data plane interfaces to said peer LSR via a label distribution protocol (LDP) message; and
    in response to said LSR receiving indication of agreement of said peer LSR to the one or more TFCs defined for at least one of the plurality of data plane interfaces, propagating traffic toward said peer LSR via the at least one agreed data plane interface, wherein traffic associated with the at least one agreed data plane interface is constrained in accordance with the corresponding one or more defined TFCs.

2. The method of claim 1, wherein traffic of a first forwarding equivalence class (FEC) type is forwarded via a first data plane interface and traffic of a second FEC type is forwarded via a second data plane interface.

3. The method of claim 2, wherein said one or more defined TFCs associated with said first data plane interface are adapted to prevent forwarding of traffic of said second FEC type.

4. The method of claim 2, wherein said one or more defined TFCs associated with said second data plane interface are adapted to prevent forwarding of traffic of said first FEC type.

5. The method of claim 1, wherein any of said one or more TFCs is based upon any of an IPv4 first forwards equivalence class (FEC) Element Type, an IPv6 Element Type, a Unicast Element Type, a Multicast Element Type, a PseudoWire Element Type and a MultiCast PseudoWire Element Type.

6. The method of claim 1, wherein said each one or more TFCs associated with the corresponding interface of the plurality of data plane interfaces are indicated via a LDP TFC Type-Length-Value (TLV).

7. The method of claim 6, wherein said LDP TFC TLV is carried within an Optional Parameter portion of a Hello Message.

8. The method of claim 1, wherein said traffic is propagated toward said peer LSR after receiving an acknowledgment message from said peer LSR.

9. The method of claim 1, wherein said traffic is propagated toward said peer LSR in accordance with the one or more defined TFCs for said at least one of the plurality of data plane interfaces, included within said acknowledgment message from said peer LSR.

10. The method of claim 9, wherein said LSR and said peer LSR iteratively exchange proposed TFCs for corresponding proposed data plane interfaces until said agreement is reached, a time interval has expired or a number of iterations has been exceeded.

11. The method of claim 1, wherein said one or more TFCs are defined in accordance with at least one of intrinsic requirements associated with LDP FEC types and extrinsic requirements associated with a particular operator.

12. The method of claim 11, wherein the intrinsic and extrinsic requirements comprise fate-separation of various traffic types in the corresponding data plane interfaces between two LDP peering nodes.

13. The method of claim 11, wherein the extrinsic requirements comprise an operator explicit configuration excluding a subset of the parallel links from forwarding a specific traffic type.

14. The method of claim 11, wherein the extrinsic requirements comprise an operator explicit configuration assigning disjoint sub-sets of links to each FEC types for fate-separation of traffic in corresponding data plane interfaces.

15. The method of claim 1, wherein a session between said LSR and said peer LSR involves a plurality of parallel links enabling label mappings exchange for multiple FEC types.

16. The method of claim 15, wherein the session is associated with a plurality of Equal Cost Multi Path (ECMP) interfaces between said LSR and said peer LSR.

17. The method of claim 1, wherein at least one determined TFC comprises disabling one or more LDP capabilities operating at a link level between said LSR and said peer LSR.

18. A telecom network element, for controlling traffic forwarding at a Label Switched Router (LSR), comprising a processor configured for:
    defining one or more traffic forwarding capabilities (TFCs) associated with each of a plurality of data plane interfaces between said LSR and a peer LSR, wherein the one or more TFCs defined for at least one interface differs from the one or more TFCs defined for at least one other interface of the plurality of data plane interfaces;
    indicating said one or more defined TFCs for each of the plurality of data plane interfaces to said peer LSR via a label distribution protocol (LDP) message; and
    in response to said LSR receiving indication of agreement of said peer LSR to the one or more TFCs defined for at least one of the plurality of data plane interfaces, propagating traffic toward said peer LSR via the at least one agreed data plane interface, wherein traffic associated with the at least one agreed data plane interface is constrained in accordance with the corresponding one or more defined TFCs.

19. A tangible and non-transient computer readable storage medium storing instructions which, when executed by a computer, adapt the operation of the computer to provide a method for controlling traffic forwarding at a Label Switched Router (LSR), the method comprising:
    defining one or more traffic forwarding capabilities (TFCs) associated with each of a plurality of data plane interfaces between said LSR and a peer LSR, wherein the one or more TFCs defined for at least one interface differs from the one or more TFCs defined for at least one other interface of the plurality of data plane interfaces;
    indicating said one or more defined TFCs for each of the plurality of data plane interfaces to said peer LSR via a label distribution protocol (LDP) message; and
    in response to said LSR receiving indication of agreement of said peer LSR to the one or more TFCs defined for at least one of the plurality of data plane interfaces, propagating traffic toward said peer LSR via the at least one agreed data plane interface, wherein traffic associated with the at least one agreed data plane interface is constrained in accordance with the corresponding one or more defined TFCs.

20. A computer program product wherein computer instructions, embodied on a non-transitory computer readable memory, when executed by a processor in a telecom network element, adapt the operation of the telecom network element to provide a method for controlling traffic forwarding at a Label Switched Router (LSR), the method comprising:
    defining one or more traffic forwarding capabilities (TFCs) associated with each of a plurality of data plane interfaces between said LSR and a peer LSR, wherein the one or more TFCs defined for at least one interface differs from the one or more TFCs defined for at least one other interface of the plurality of data plane interfaces;
    indicating said one or more defined TFCs for each of the plurality of data plane interfaces to said peer LSR via a label distribution protocol (LDP) message; and
    in response to said LSR receiving indication of agreement of said peer LSR to the one or more TFCs defined for at least one of the plurality of data plane interfaces, propagating traffic toward said peer LSR via the at least one agreed data plane interface, wherein traffic associated with the at least one agreed data plane interface is constrained in accordance with the corresponding one or more defined TFCs.

* * * * *